INVENTOR.
JAMES R. WARREN

2,996,267
VIBRATION DAMPING MECHANISM
James R. Warren, Washington, D.C., assignor to the United States of America as represented by the Secretary of the Navy
Filed Dec. 6, 1954, Ser. No. 473,490
3 Claims. (Cl. 244—14)

This invention relates to an oscillation damping mechanism and more particularly to a mechanism for damping wing oscillations of airborne missiles.

It is generally the practice in the guided missile art to provide wing locks for locking the wings of a missile in a fixed position during launching and prior to the advent of guidance control. At the specified time, when it is desired to regulate the course of the missile, the wing locks retract and the servo-control mechanism of the guidance system assumes command of the wings.

However, in order to protect the servo-control mechanism from self-inflicted damage in operating against the wing locks, there is provided a time interval between wing lock retraction and the advent of guidance control. During this period of time the wing is free of any control whatsoever and is especially subject to regenerative oscillations. At the ultra-high speeds experienced by airborne guided missiles these regenerative oscillations reach destructive proportions and it is to this cause that wing failures in guided missiles have been attributed.

The principal object of the present invention is to correct this disadvantageous situation by providing a damping mechanism which will limit the oscillatory movements of a missile wing.

It is another object of the invention to provide a damping mechanism, the damping action of which may be varied to selectively eliminate only those oscillations thought to be damaging to the structural parts of the missile wing.

Figure 1:
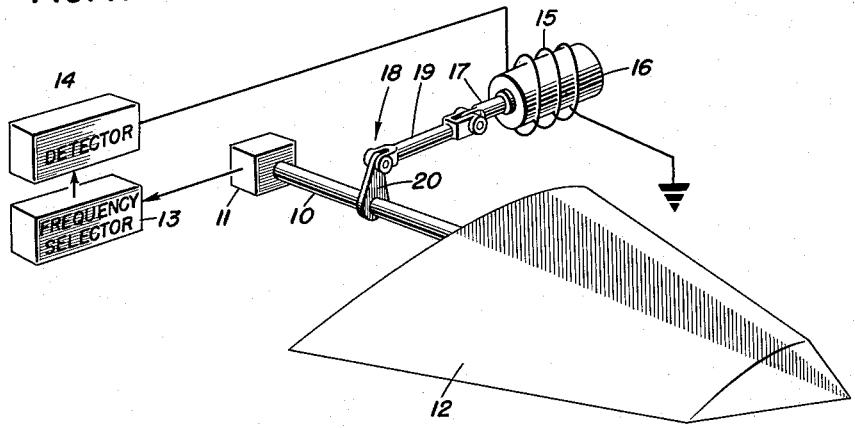
Figure 2:
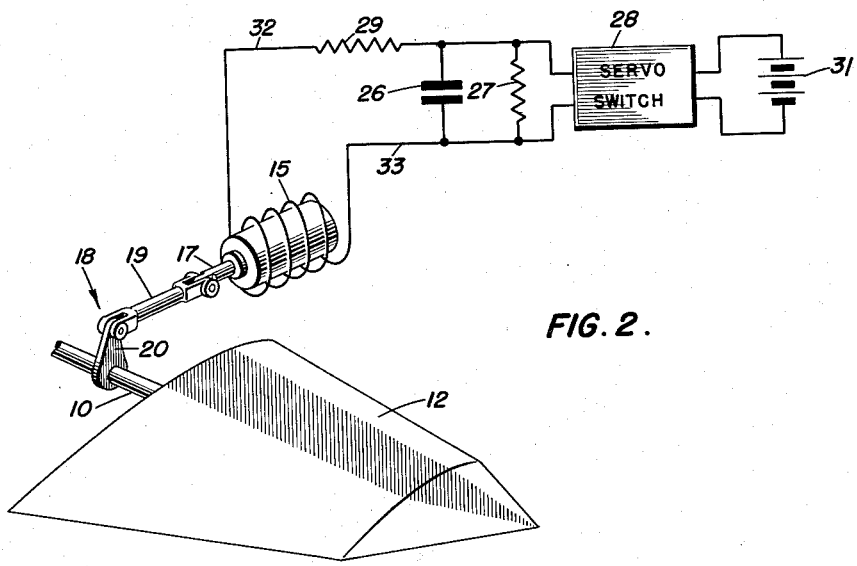

Still further objects and advantageous aspects of the invention will become apparent from the following detailed description taken in conjunction with the accompanying drawings, and in which:

FIG. 1 is a diagrammatic view of one embodiment of the invention illustrating the arrangement of the elements of the damping mechanism in relation to the missile wing; and FIG. 2 is a diagrammatic view of a second embodiment of the invention similarly illustrating the arrangement of the elements of the damping mechanism in relation to the missile wing.

Broadly, the invention includes a dashpot mechanism, the movable member of which is connected to the wing by a mechanical linkage so that oscillatory movements of the wing may be controlled by the movable member. Movement of this movable member is resisted by a fluid, the viscosity of which is variable. By varying the viscosity of the fluid the mobility of the movable member is varied. A viscosity is chosen which will prevent extreme and rapid movements of the movable member and hence oscillations which will damage the structural parts of the wing.

Referring now to FIG. 1, there is shown a missile wing 12 which is connectable to the body of the missile by a stub shaft 10. Shaft 10 also serves to control the attitude of the wing 12 with respect to the missile body.

An end instrument 11, of the type commonly used in the telemetering phase of the guided missile art to measure angular displacement, is operatively connected to the stub shaft 12 to receive movements of the shaft.

The end instrument 11 is also conventionally known as an angular position indicator or a motion meter and, generally, comprises a threaded shaft which, when rotated, moves a magnetic shunt in the field of a control coil constituting the inductive element of an oscillator. As the magnetic shunt moves, the effective inductance of the control coil and hence the frequency of the oscillator, changes.

The output of the end instrument 11, i.e. the output of the oscillator thereof, is connected to a filter 13 the output of which is fed into a detector 14.

A coil 15 surrounding a hydraulic cylinder 16 containing a magnetic fluid e.g. a mixture of oil and iron filings, is connected to the output of the detector 14. A piston, slidably mounted within the cylinder 16, is connected by a piston rod 17 and a suitable mechanical linkage 18 consisting of elements 19 and 20 to the stub shaft 10 so that movements of shaft 10 and thus the wing 12 may be controlled by the movements of the piston 17.

In operation, movements of the wing 12 are transmitted through the stub shaft 10 to the mechanical linkage 18, to the piston rod 17 and ultimately to the piston in cylinder 16 which is restrained in movement by the magnetic mixture in the cylinder 16. Conversely, it is understood that a restraint on the movement of the piston in cylinder 20 constitutes a resistance to the movement of the wing 12.

Thus, it can be seen that the degree of movement of the wing 12 determines the degree of resistance offered by the fluid mixture to a recurrent movement of the wing 12. Therefore, vibrations of the regenerative type are effectively damped.

The mechanism exerts this stabilizing effect during the entire flight of the missile and only those vibrations considered to be damaging to the structural parts of the wing are damped.

Turning now to the second embodiment of the invention as illustrated in FIG. 2, the piston rod 17, slidably connected to the piston mounted within the cylinder 16 filled with a mixture of oil and iron fillings, is connected by means of the mechanical linkage 18 to the wing 12, through the stub shaft 10. As in the first embodiment of the invention, the movements of the wing 12 are controllable through the mechanical linkage 18 by the movements of the piston in cylinder 16. Coil 15 surrounds the cylinder 16 as in the previously described embodiment of the invention illustrated in FIG. 1, and it is connected in parallel with a capacitor 26, a leak resistance 27, and a servo switch 28; and in series with a limiting resistance 29 to a source of direct current electricity 31 by leads 32 and 33.

The current passing through the coil 15 of FIG. 2 determines the strength of the magnetic field produced within the cylinder 16 and hence, the viscosity of the fluid mixture. The source of electricity 31, the limiting resistance 29, and the leak resistance 27 are appropriately chosen to provide a constant current through the coil which determines a viscosity sufficient to dampen those vibrations considered to be damaging to the structural parts of the wing 12.

Prior to launching of the missile the servo switch 28 is closed, thus energizing the coil 15, of FIG. 2. With the advent of guidance system control, the servo switch 28 is opened to electrically disconnect the source of electricity 31 from the remainder of the circuit. The charge of the capacitor 26 then decays to supply energizing current through the coil 15, of FIG. 2. This provides a smooth transition to guidance system control.

In this manner the damping influence exerted by the mechanism upon the wing 12 continues until some time after the advent of guidance system control when the capacitor 26 has released its charge. After the charge on the capacitor 26 has been exhausted, the damping mechanism has no effect on the movements of the wing 12, Obviously many modifications and variations of the present invention are possible in the light of the above teachings. It is therefore to be understood that within the scope of the appended claims the invention may be practiced otherwise than as specifically described.

What is claimed is:

1. In a vibration damping mechanism for use in damping wing oscillations of an airborne missile during uncontrolled guidance thereof and releasable therefrom with the advent of controlled guidance of said missile, the combination of, a container, a mixture of a viscous substance and a magnetizable substance substantially filling said container throughout, a movable member working within said container and connected through a mechanical linkage to said missile wing so that oscillatory movements of the wing are controlled by said movable member, a magnetizing coil surrounding said container, and an electrical circuit including said coil, a capacitor and switch means in parallel with a source of electricity, whereby upon closing said switch means, said capacitor is charged and said coil is energized to produce a magnetic field within said container, thereby affecting the viscosity of said mixture and the mobility of said piston in control of said missile wing, said switch means being arranged to be opened with the advent of guidance control so that said source of electricity is disconnected from said circuit, the charge of said capacitor then decaying to supply energizing current through said coil to provide a smooth transition to guidance control, whereby when said capacitor has released its charge, said damping mechanism has no effect on the movement of said missile wing.

2. The arrangement as set forth in claim 1, wherein said switch means includes a servo switch operable to electrically disconnect said magnetizing coil and capacitor from said source of electricity.

3. A vibration damping mechanism for use in limiting the oscillatory movements of a wing of a missile during uncontrolled guidance and for providing smooth transition to controlled guidance thereof, comprising, a container, a mixture of a viscous substance and a magnetizable substance substantially filling said container throughout, a movable member working in said container and connected through a mechanical linkage to said missile wing so that oscillatory movements of said wing are controlled by said movable member, a magnetizing coil surrounding said container, and means including an electrical circuit connected to said coil and having a capacitor and a servo switch connected in parallel with a source of electricity, said servo switch being arranged to be closed prior to launching of said missile to energize said coil and charge said capacitor, said servo switch being opened during launching and the advent of guidance control of said missile to electrically disconnect said source of electricity from said circuit, with said capacitor being so arranged that its charge decays to supply energizing current through said coil to provide a smooth transition to guidance control, whereby after said capacitor has released its charge, said damping mechanism has no effect on the movement of said wing.

References Cited in the file of this patent

UNITED STATES PATENTS

| | | |
|---|---|---|
| 2,342,578 | Giannini | Feb. 22, 1944 |
| 2,361,071 | Vang | Oct. 24, 1944 |
| 2,661,596 | Winslow | Dec. 8, 1953 |
| 2,667,237 | Rabinow | Jan. 26, 1954 |
| 2,669,325 | Raines | Feb. 16, 1954 |

FOREIGN PATENTS

| | | |
|---|---|---|
| 461,353 | Great Britain | Feb. 12, 1937 |
| 747,147 | Germany | Jan. 8, 1945 |
| 704,084 | Great Britain | Feb. 17, 1954 |